US011347830B2

(12) United States Patent
Park

(10) Patent No.: US 11,347,830 B2
(45) Date of Patent: May 31, 2022

(54) CONTENT RECORDING AND GROUP ENCRYPTION

(71) Applicant: Comcast Cable Communications, LLC, Philadelphia, PA (US)

(72) Inventor: Kyong Park, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 423 days.

(21) Appl. No.: 16/236,831

(22) Filed: Dec. 31, 2018

(65) Prior Publication Data

US 2020/0210550 A1 Jul. 2, 2020

(51) Int. Cl.
*G06F 21/10* (2013.01)
*H04N 21/4147* (2011.01)
*H04N 21/254* (2011.01)
*H04L 9/40* (2022.01)
*H04L 9/08* (2006.01)
*H04N 21/2347* (2011.01)

(52) U.S. Cl.
CPC .......... *G06F 21/10* (2013.01); *H04L 9/0819* (2013.01); *H04L 63/0435* (2013.01); *H04L 63/0478* (2013.01); *H04N 21/2347* (2013.01); *H04N 21/2541* (2013.01); *H04N 21/4147* (2013.01); *G06F 2221/0724* (2013.01)

(58) Field of Classification Search
USPC ........................................................ 380/202
See application file for complete search history.

(56) References Cited

U.S. PATENT DOCUMENTS

| 2003/0097564 | A1* | 5/2003 | Tewari | H04L 29/12113 713/171 |
| 2004/0073451 | A1* | 4/2004 | Maari | H04L 63/0428 705/52 |
| 2004/0139024 | A1* | 7/2004 | So | H04L 63/0428 705/51 |
| 2005/0071280 | A1* | 3/2005 | Irwin | H04L 63/065 705/59 |
| 2007/0185813 | A1* | 8/2007 | Shear | G06Q 30/06 705/51 |
| 2008/0010207 | A1* | 1/2008 | Yanagihara | H04L 63/0823 705/51 |
| 2014/0153907 | A1* | 6/2014 | Farah | H04N 9/7921 386/297 |
| 2018/0260578 | A1* | 9/2018 | Orloff | G06F 21/53 |
| 2018/0373879 | A1* | 12/2018 | Lango | G06F 21/575 |

FOREIGN PATENT DOCUMENTS

TW I304970 B * 1/2009 ............. G06F 21/10

* cited by examiner

Primary Examiner — Sakinah White Taylor
(74) Attorney, Agent, or Firm — BakerHostetler

(57) ABSTRACT

Systems and methods for managing group encryption are described. In certain methods, a content asset may be encrypted with an asset key. An account key may be determined. Using the account key, an encrypted content asset package may be generated. The asset key may make up at least a portion of the encrypted content asset package. The encrypted content asset package is decryptable with the account key. The encrypted content asset package and an identifier associated with the account key may be transmitted, for example to a playback device.

20 Claims, 8 Drawing Sheets

CONTENT RECORDING AND GROUP ENCRYPTION

BACKGROUND

Content recording systems and devices, such as digital video recorders (DVRs), may facilitate the recording of various content assets. For example, a standard in-home DVR may record content locally. As another example, a cloud or network DVR service may allow an at-home user to request that a particular content asset be recorded. Instead of, or in addition to, the content being recorded on a device in the user's home, as with the standard DVR configuration, the cloud or network DVR service records and stores a copy of the requested content asset on the service provider's servers for the requesting user. When the user wishes to view the content asset, the cloud or network DVR service then delivers the copy of the recorded content to the user's cable box, mobile device, web browser, or the like for playback.

To manage the security and/or rights associated with the content, devices receiving the content may implement a content decryption cipher in order to decrypt the content for rendering. Typically, digital rights management (DRM) platforms are configured to conduct one DRM licensing transaction per content asset such that a volume of individually encrypted recordings creates an equal volume of DRM licensing transactions. Accordingly, as the number of recorded assets (and other content assets) increases, the number of DRM licensing transactions increases, consuming increased resources such as bandwidth and processing capacity. These and other shortcomings are addressed by the present disclosure.

SUMMARY

Methods and systems for managing recorded content are described. Methods and systems of the present disclosure may implement a session-oriented license model that may minimize capacity demands and content startup latency. As an example, an account key may be used to encrypt certain content packages to minimize the number of license transactions that are required to enable access and playback of one or more content assets, such as recorded content assets.

One method comprises creating a customer-specific encryption key (e.g., account key) for encrypting digital information. The account key may be based on a customer number, user identifier, account identifier, and the like. The account key may be associated with one or more devices such that the devices may encrypt and decrypt the digital information using the account key. Because each device may have the same encryption key (e.g., account key), the encrypted data may be encrypted by a first device, transferred from the first device to a second device and decrypted and read by the second device. Thus, encrypted digital information may be shared between devices that generate a customer-specific encryption key from a common customer number.

BRIEF DESCRIPTION OF DRAWINGS

The following detailed description is better understood when read in conjunction with the appended drawings. For the purposes of illustration, examples are shown in the drawings; however, the subject matter is not limited to the specific elements and instrumentalities disclosed. In the drawings.

DETAILED DESCRIPTION

Methods and systems are described for managing recorded content in a system, such as a digital video recorder (DVR) or network digital video recorder (NDVR) system. Fundamentally, the subscriber account targeted by recording content is known at the time in which recording content is created. Each recording instance may be encrypted with a unique content encryption key (CEK) such as an asset key. Moreover, the protected content may be augmented to embed the unique CEK in a wrapped form such as a wrapped content encryption key (WCEK).

The content protection system may selects and/or assigns an account-oriented key wrapping key (AWK) such as an account key. The AWK may be used to encrypt the CEK resulting in the WCEK. The WCEK may be embedded in the content meta-data. The AWK may also be identified within the content meta-data via an approach such as the embedding of an AWK identifier. As content is acquired by clients, the AWK identifier is resolved. User devices such as clients may check its local AWK cache for the AWK as specified by the AWK identifier.

As one possible outcome, the AWK is available via the local cache, the AWK is used to directly decrypt the WCEK permitting the calculation of the CEK and then applied to protected content for immediate decryption and rendering. In this event, the DRM licensing transaction is mitigated.

As another possible outcome, when the AWK is not available via the local cache, an AWK licensing endpoint is accessed by the device. Provided the AWK licensing endpoint authenticates the client with respect to clients' account identity, whether directly per the account or indirectly via user or device, the licensing endpoint may also accept and process parameters associated with the encryption event such as an AWK identifier (or other factors related to key selection such as time) or a wrapped AWK to a) identify the account, b) authorize the client per the verified account identity based on business specific rules such as account status according to payments/balances, c) resolve the AWK whether based on a key identifier, other key selection factors such as time, or a wrapped AWK encrypted with an AWK wrapping key accessible to the licensing endpoint, d) provided the device makes its own device-specific wrapping key material available such as an X509 certificate that may be authenticated at the time of licensing or an extension to a previously negotiated session offering session keys, wraps the AWK in a response with caching rights, e) the device downloads the AWK and stores the AWK into the local cache. The AWK may then be exercised for immediate decryption and rendering per the previous outcome and/or exercised for future content downloads. Additionally or alternatively, the AWK value may diversified via mechanisms such as renewed periodically as a function of time.

Figure 1:
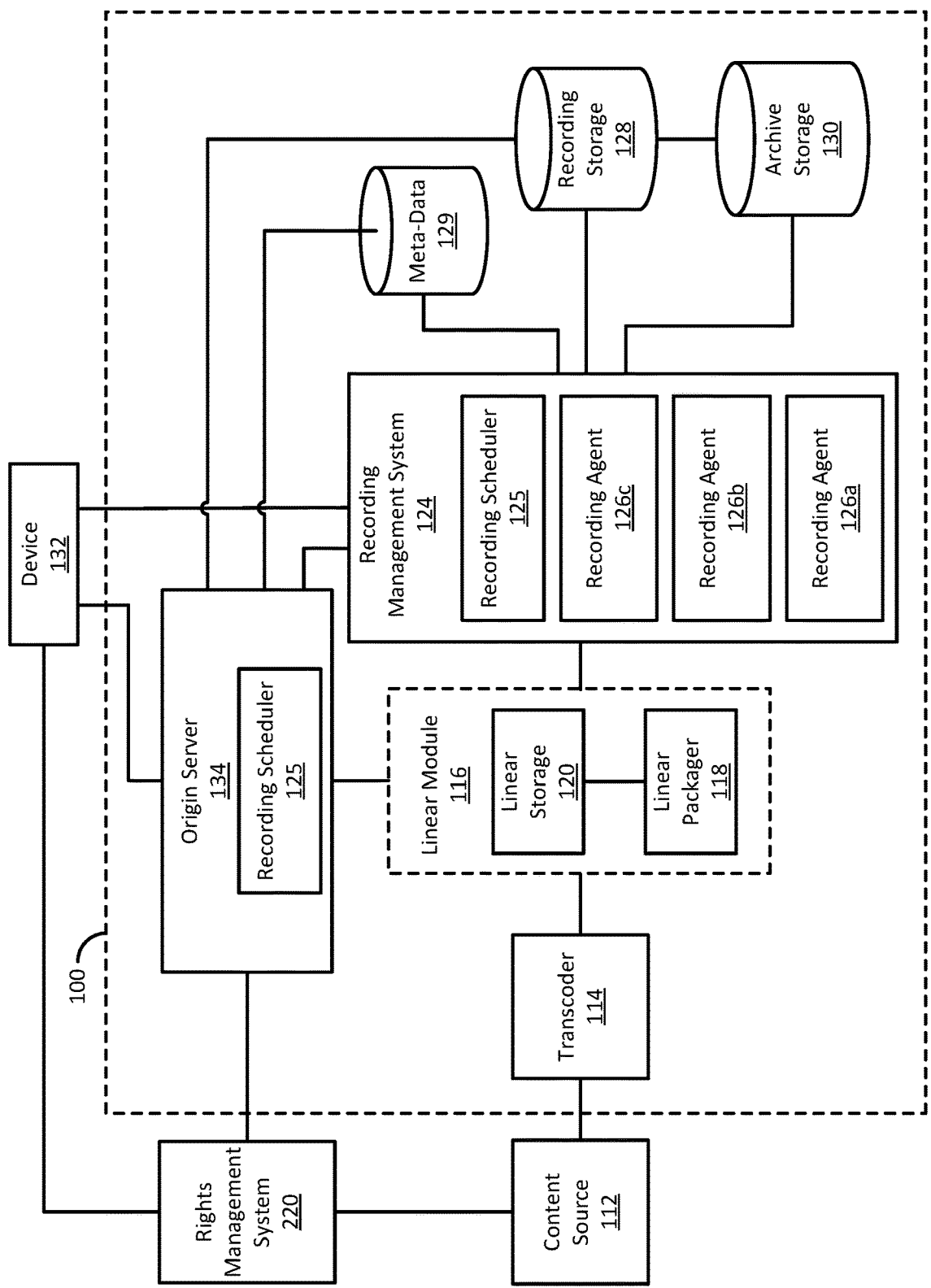
FIG. 1 shows a block diagram of an example of a system in accordance with aspects of the disclosure.

FIG. 1 shows an exemplary system 100, such as a cloud or network DVR system, by which a service provider, such as a cable television service provider, may receive a request to record content, store the requested content, and potentially fulfill a request to deliver the requested content for playback. Other systems such as local DVR system may implement the aspects of the present disclosure. Content may comprise a content asset or program, such as linear content, and may further comprise sequential content such as, for example, a television show, a movie, a sports event broadcast, or the like. As used herein, content may additionally include a portion of a program or content asset.

The request to record content may be received from a device 132 and the requested content may be delivered to the device 132 for playback. As used herein, the device 132 may refer to a hardware element, such as a set-top cable box, a streaming-video player, or a quadrature amplitude modulation (QAM) client, or a software element, such as a web browser or other software adapted to playback video. It will be appreciated that the device 132 used to request that the content be recorded in the system 100 may be distinct from the device 132 used to receive the recorded content for playback. To illustrate, a user may use his or her local device (e.g., set-top cable box or other computing device) to request that a particular content be recorded in the system 100, but may later request and playback the content with software running on his or her smart phone. The device 132 may be connected to the system 100 via any suitable network, which may comprise, for example, a cable network, satellite network, and/or the Internet.

The system 100 may include a transcoder 114. The transcoder 114 may receive content from a content source 112. The content may be in any one of a variety of formats, such as, for example, H.264, MPEG-4 Part 2, or MPEG-2. The content may be transmitted using one or more standards such as SCTE 35 or other specifications. The transcoder 114 may convert the content from one video format to another video format, such as one amenable to the means by which the service provider's users view the content. The transcoder 114 may additionally segment the content into a plurality of segments. For example, content may be segmented into a series of 2-second segments, 10-second segments, or other fixed or variable time segments.

Digital audio/video compression may be used, such as MPEG, or any other type of compression. Although reference may be made to example standards (e.g., MPEG) and formats, one of skill in the art will recognize that the systems and methods described herein are applicable to ant format or standard that support audio and/or video. As an example, the Moving Pictures Experts Group (MPEG) was established by the international Standards Organization (ISO) for the purpose of creating standards for digital audio/video compression. The combined MPEG-1, MPEG-2, and MPEG-4 standards are hereinafter referred to as MPEG. In an MPEG encoded transmission, content and other data are transmitted in packets, which collectively make up a transport stream. Additional information regarding transport stream packets, the composition of the transport stream, types of MPEG tables, and other aspects of the MPEG standards are described below. The present methods and systems may employ transmission of MPEG packets. However, the present methods and systems are not so limited, and may be implemented using other types of transmission and data.

The output of a single MPEG audio and/or video coder may be referred to as a transport stream. The transport stream may comprise one or more elementary streams. An elementary stream may be or comprise an endless near real-time signal. For convenience, the elementary stream may be broken into data blocks of manageable size, forming a packetized elementary stream (PES). These data blocks need header information to identify the start of the packets and must include time stamps because packetizing disrupts the time axis. For transmission and digital broadcasting, for example, several programs (e.g., content assets) and their associated PESs may be multiplexed into a multi program transport stream. A multi program transport stream has a program clock reference (PCR) mechanism that allows transmission of multiple clocks, one of which may be selected and regenerated at the decoder.

A multi program transport stream may comprise a multiplex of audio and video PESs. In addition to the compressed audio, video and data, a transport stream may comprise metadata describing the bit stream. Such metadata may comprise a program association table (PAT) that lists every content asset (e.g., program) in the multi program transport stream. Each entry in the PAT may point to a program map table (PMT) that lists the elementary streams making up each content asset. Some content may be unencrypted, but some content may be subject to conditional access (encryption) and this information is also carried in the metadata. The transport stream may be comprised of fixed-size data packets, for example, each containing 188 bytes. Each packet may carry a program identifier code (PID). Packets in the same elementary stream may all have the same PID, so that the decoder (or a demultiplexer) may select the elementary stream(s) it wants and reject the remainder. Packet continuity counts ensure that every packet that is needed to decode a stream is received. A synchronization system may be used so that decoders may correctly identify the beginning of each packet and deserialize the bit stream into words.

A content asset, such as a program, may be a group of one or more PIDs that are related to each other. For instance, a multi program transport stream used in digital television might contain three programs, to represent three television channels. In some example, each channel may include one video stream, one or two audio streams, and any necessary metadata. A receiver wishing to tune to a particular "channel" merely has to decode the payload of the PIDs associated with its program. The receiver may discard the contents of all other PIDs.

The multi program transport stream may carry many different programs and each may use a different compression factor and a bit rate that may change dynamically even though the overall bit rate stays constant. This behavior is called statistical multiplexing and it allows a program that is handling difficult material to borrow bandwidth from a program handling easy material. Each video PES may have a different number of audio and data PESs associated with it. Despite this flexibility, a decoder must be able to change from one program to the next and correctly select the appropriate audio and data channels. Some of the programs may be protected so that they may only be viewed by those who have paid a subscription or fee. The transport stream may comprise Conditional Access (CA) information to administer this protection. The transport stream may comprise Program Specific Information (PSI) to handle these tasks.

The video stream (e.g., SCTE 35 stream) may comprise a unique content identifier representing the underlying content programing. As such, a recipient device or downstream device, such as the transcoder 114, may receive the video stream and may condition the video stream based at least on the content identifier and the content boundary information to fragment the stream as necessary to align with one or more boundary points in the video stream. In turn, a linear packager 118 may generate a manifest comprising at least the content identifier, the content boundary information, and information relating to the fragments that align with the content boundaries.

The transcoder 114 may be communicatively connected to a linear module 116, which in turn may include the linear packager 118 and a linear storage 120. The linear packager 118 and the linear storage 120 may be communicatively connected. It will be appreciated that the linear module 116 may refer generally to one or more interconnected servers, storage devices, logical elements, and the like.

The linear packager 118 may receive the content from the transcoder 114 or the recording management system 124 (discussed further herein). The linear packager 118 may determine how the content is to be segmented and put together for delivery to and eventual playback by the device 132. As part of this process, the linear packager 118 may segment the content (such as in the event that the content has not yet been segmented) or may re-segment the content (such as in the event that the content had been previously segmented). The linear packager 118 may additionally insert one or more cues or markers into the content segments at which one or more additional segments, such as segments comprising an advertisement, may be inserted by an upstream client, server, or logical module, such as the device 132 or the origin server 134.

The linear packager 118 may create a manifest file associated with the content. Generally, a manifest file may contain information describing various aspects of the associated content that may be useful for the device 132 to playback the content and/or for the recording management system 124 to store and retrieve the content. The manifest file may comprise at least the content identifier, the content boundary information, and information relating to the fragments that align with the content boundaries. The manifest file may indicate the segments comprising the content, the length of each segment, the number of segments, and/or the proper ordering of the segments necessary to effectuate a playback of the content. A manifest file may further include a network location (e.g., a hyper-text transfer protocol (HTTP) uniform resource locater (URL) link or other universal resource identifier (URI)) for each segment from which the segment may be downloaded, accessed, or retrieved. For example, the network location may indicate a location on the linear storage 120 or recording storage 128. It will be appreciated that the network locations included within a manifest file may point to more than one different location or source.

The network location for segments corresponding to the content may reference a location on the linear storage 120 while the network location for segments corresponding to an inserted advertisement may reference a location from outside the system 100. In some instances, a manifest file may describe multiple versions (e.g., different quality levels) of the content, including corresponding information on those segments. A manifest file may be provided, such as by the origin server 134, to the device 132 in response to a request to receive content recorded within the system 100. The device 132 may use the manifest file to determine the segments required to play the content or a portion of the content and subsequently download the required segments using the network locations specified in the manifest file.

The content or portions thereof may be stored in the linear storage 120, which may be accessed by the device 132 directly or indirectly via the origin server 134 to deliver the content to the device 132. The storage of the content or portions thereof may occur, in an aspect, after the linear packager 118 processes the content. The linear storage 120 may include one or more data storage devices, such as volatile memory (e.g., random access memory (RAM)), a hard disk drive, a network-attached storage (NAS), and/or a storage area network (SAN) upon which the content or portions thereof may be stored.

A recording management system 124 may be communicatively connected to the linear module 116 and one or more devices 132. The recording management system 124 may receive one or more requests from devices 132 to record content. The request to record content may include, for example, identifications of the user (e.g., an account identifier, a username, and/or a password), the device 132, the content, the station, the stream, the start time of the content, and/or the end time of the content. Upon receiving a request to record content, the recording management system 124 may access the segmented content from the linear module 116 (e.g., the linear packager 118 and/or the linear storage 120) and prepare to store a recording of the content in a communicatively connected recording storage 128. The recording storage 128 may include one or more storage devices, such as a hard disk drive, a network-attached storage (NAS), and/or a storage area network (SAN).

The recording management system 124 may include a recording scheduler 125. The recording scheduler 125 may be configured to manage the requests to record that are received via the recording management system 124 or other component. The recording scheduler 125 or a component configured with similar operable capabilities may be stand-alone or may reside outside of the recording management system 124, such as with the origin server 134. The recording scheduler 125 may be configured to manage the transmission (e.g., assignment) of recording request to one or more recording agents 126*a-c*. Certain requests may be for an entire content asset (e.g., program) and may be marked appropriately as an entirety type recording, such as using the syntax "RECORD ENTIRETY" with a unique programming ID relating to the desired content for recording. Other syntax and requests may be processed via the recording scheduler 125 to effect recording of content.

The recording management system 124 may include a plurality of the recording agents 126*a-c*, which may each represent a pool of resources available to independently perform a recording task, such as writing copies of a segment to the recording storage 128. The recording management system 124 may track and maintain the status of each of the recording agents 126*a-c*. For example, the recording management system 124 may, at any given time, know which recording agents 126*a-c* are busy performing a recording task and which are available to be assigned a recording task to perform. As each of the recording agents 126*a-c* completes a recording task, the recording agent 126*a-c* may indicate to the recording management system 124 that the recording agent 126*a-c* is now available. In another aspect, each of the recording agents 126*a-c* may maintain each recording agents' 126*a-c* respective state (e.g., busy, available, etc.) instead of the recording management system 124 maintaining the state of each of the recording agents 126*a-c*. In such an aspect, a queue of available recording agents 126*a-c* may be maintained, such as by the recording management system 124. When one of the recording agents 126*a-c*, such as recording agent 126*a*, becomes available, the recording agent 126a may insert itself into the queue. When the recording management system 124 has a task to be performed, the recording management system 124 may query the queue for the next available recording agent 126a-c and assign the task to that recording agent 126a-c.

The recording management system 124 may access, such as from the linear storage 120, a segment of content that has been requested to be recorded. Based on this single access of the segment, the recording management system 124 may direct one of the available recording agents 126a-c, such as recording agent 126a, to write a copy of this segment to the recording storage 128 for each request for the content to be recorded. As an example, the recording agent 126a may provide an instruction, such as over a network socket, to the recording storage 128, wherein the instruction specifies the file of the segment and the number of times that the file is to be copied to the recording storage 128. The instruction may include an HTTP command, such as PUT, POST, or PATCH. In this manner, the segment is written multiple times to storage, but is accessed (i.e., read) only a single time. Thus, this may result in a performance increase of the recording management system 124 and the system 100 as a whole because the read operation of the segment from the linear storage 120 need only occur a single time for all the segment copies instead of once for each segment copy. When the recording agent 126a finishes writing the copies of the segment to the recording storage 128, the recording agent 126a may indicate to the recording management system 124 that the recording agent 126a has successfully written the copies of the segment and that the recording agent 126a is available to perform another recording task. In the event that the recording agent 126a is unsuccessful in its task (e.g., the recording storage 128 indicates a disk error), the recording agent 126a may indicate so to the recording management system 124 and the recording management system 124 may direct the recording agent 126a to attempt to repeat the recording task or assign the recording task to another of the recording agents 126a-c, such as recording agent 126b. This process may be repeated until all of the segments of the content are copied to the recording storage 128 and there is a complete copy of the content in the recording storage 128 for each user request to record the content.

The recording agents 126a-c may be configured to monitor the schedule of recordings (e.g., via the recording scheduler 125) and may determine any changes with manifest via the linear packager 118. The recording agents 126a-c may be configured to update scheduling information in a meta-data database 129. The meta-data database 129 may be configured to store various forms of information including, but not limited to, scheduling information, recording and video playback data, and device, user, and/or content identifiers.

In operation, the recording management system 124 may receive one or more linear video streams or fragments thereof. As the recording management system 124 receives request to record certain content, for example, based on a unique content identifier, the recording management system 124 may cause particular portions of the linear video stream to be recorded. For example, a user may request that content having a content identifier of "Program One" to be recording in its entirety. As such, the recording management system 124 may process the request and may schedule the recording. However, rather than simply recording a particular channel of content, the recording management system 124 may begin recording when a particular syntax or event code is detected in the linear video stream or fragments thereof.

An archive storage 130 may be communicatively connected to the recording management system 124 and/or the recording storage 128, and may include one or more storage devices, such as a hard disk drive, a network-attached storage (NAS), and/or a storage area network (SAN). The archive storage 130 may archive copies of content that have spent a certain amount of time in the recording storage 128. That is, once a certain amount of time passes since content has been recorded and copies made in the recording storage 128, the copies in the recording storage 128 may be deleted and a single copy may be made in the archive storage 130. If the archived content is requested by a user to be delivered to the device 132 of the user for playback, the recording management system 124 may access the copy of the content in the archive storage 130 and make a new copy of the content in the recording storage 128. The copy of the content in the recording storage 128 may then be delivered to the device 132 of the user, either directly or via the origin server 134, which may be communicatively connected to the recording storage 128 directly or via the recording management system 124.

In an aspect, the segmented nature of the content may be leveraged to begin delivering the content from the recording storage 128 to the device 132 before the content is completely copied over from the archive storage 130. In this instance, when a user requests delivery of content archived in the archive storage 130, the recording management system 124 may begin by copying the first segment of the content to the recording storage 128. The origin server 134 need not wait until all of the segments of the content are copied to the recording storage 128 before beginning to deliver the content to the device 132, but may instead begin delivering the segments of the content when the first segment (or otherwise sufficient beginning subset of the segments) is copied to the recording storage 128. The recording management system 124 may then continue copying subsequent segments (e.g., the second segment, the third segment, and so forth) of the content to the recording storage 128, which may then be delivered to the device 132. Preferably, the subsequent segments may be copied from the recording storage 128 to the archive storage 130 and delivered to the device 132 at a rate sufficient for the playback of the segments on the device 132 to be seamlessly maintained. If the playback on the device 132 is stopped or paused and no additional segments of the content are requested, a full duplicate copy may still be created. Thus in this instance, the recording management system 124 may determine the segments of the content that do not need to be delivered to the device 132 (e.g., segments preceding a mid-program playback start point, segments that are skipped during playback, such as those for a commercial, and segments subsequent to a playback stop point) and have not yet been copied to the recording storage 128. Those segments may then be copied from the archive storage 130 to the recording storage 128 to reconstitute the entire unique copy of the content.

The origin server 134 may receive and fulfill a request from the device 132 of a user to deliver a recorded content to the device 132 for playback. The request from the device 132 to deliver the recorded content may include identifications of the user (e.g., an account identifier, a username and/or a password), the device 132, the requested content, and/or a playback time point or temporal location (e.g., the start of an asset or the 12:30 mark in a 30:00 asset). In certain aspects, the request to deliver the content may reflect a user skipping to a particular portion of content of which the initial segments of the content have already been delivered and are being played on the device 132. For example, a user may have started viewing the first minute of a content asset and then decided to skip to a midway point of the content asset. In this case, the request to deliver the content asset would indicate that the device 132 required the segments of the content asset from that midway point and after. Upon receiving a request to deliver a recorded content to the device 132, the origin server 134 may provide one or more manifest files (discussed further herein) to the device 132 that describe the content and segments thereof, including network locations from which each segment may be downloaded. Using the manifest file, the device 132 may iteratively download the segments comprising the content. As the device 132 downloads sufficient segments of the content, the device 132 may begin playback of the content.

Figure 2:
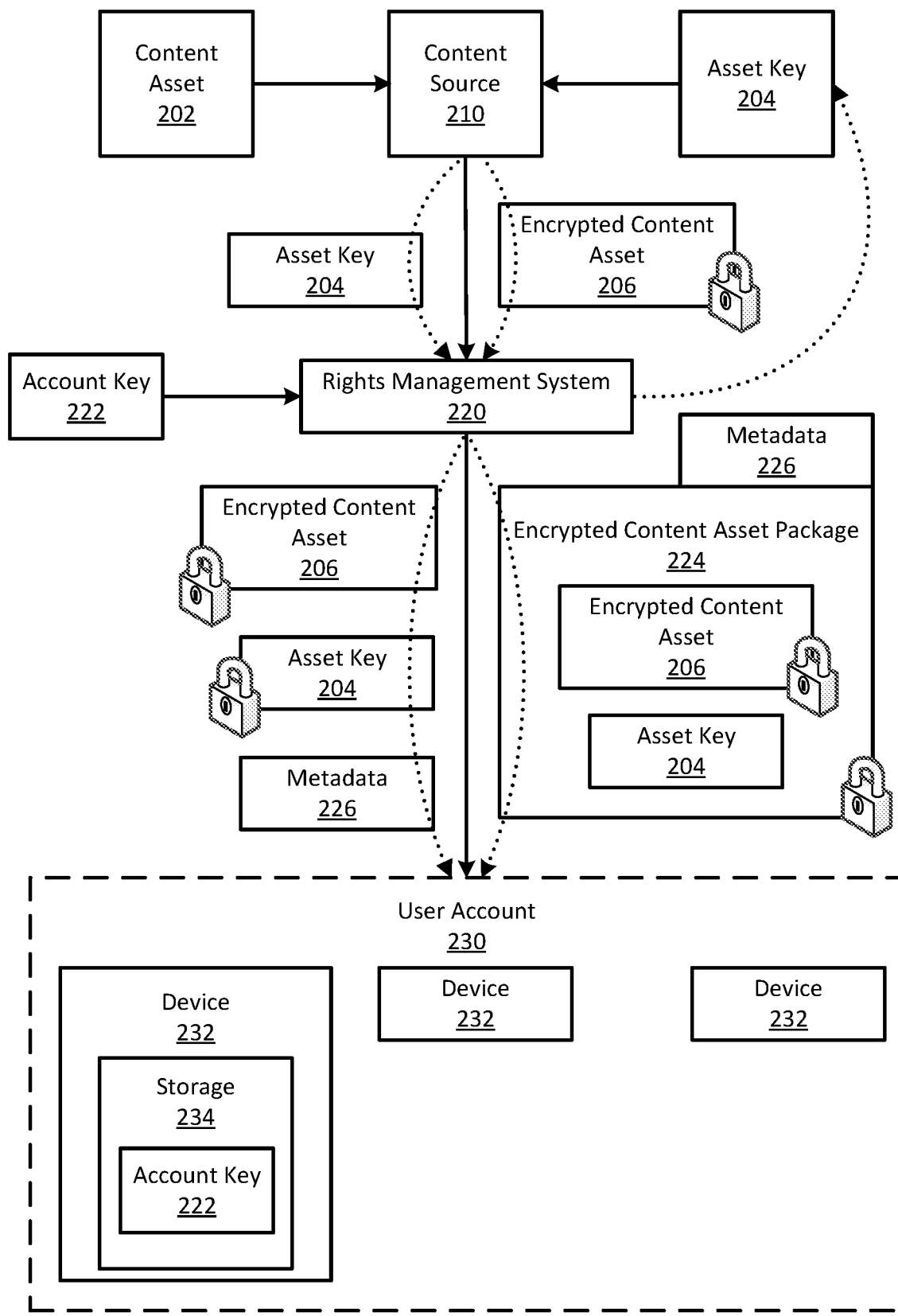
FIG. 2 shows a block diagram of an example of a system in accordance with aspects of the disclosure.

Referring to FIG. 2, methods and systems are described for managing recorded content in a system, such as a digital video recorder (DVR) or network digital video recorder (NDVR) system. Fundamentally, the user account (e.g., user account 230) targeted by recording content may be known at the time in which recorded content is created. A content source 210 may be or comprise a device, system, and/or network such as, for example, system 100 (FIG. 1). Content assets 202, such as recorded content instances, may be encrypted with a unique content encryption key (CEK) such as an asset key 204 to generate an encrypted content asset 206. The encrypted content asset 206 may be transmitted to various recipient devices, wherein the asset key 204 may be shared to facilitate decryption of the encrypted content asset 206 to expose the underlying decrypted content asset 202. As an example, the encrypted content asset 206 may be augmented to embed the asset key 204 in a wrapped form such as a wrapped content encryption key (WCEK).

A rights management system 220 (e.g., content protection system, key management system/server) may select and/or assign an account-oriented key wrapping key (AWK) such as an account key 222. The account key 222 may be used to further encrypt or wrap the encrypted content asset 206 resulting in an encrypted content asset package 224 (e.g., WCEK). The encrypted content asset package 224 may be embedded in the content meta-data 226. The encrypted content asset package 224 may comprise the encrypted content asset 206 and/or the asset key 204. Other information may be encrypted/wrapped into the encrypted content asset package 224. The account key 222 (e.g., AWK) may be identified within the content meta-data 226 via an approach such as the embedding of an AWK identifier. As content is acquired by devices 232 (e.g., clients), the AWK identifier is resolved. The devices 232 may check storage 234 such as a local cache for the AWK (e.g., account key 222) as specified by the AWK identifier.

As an illustrative example, the account key 222 may be available via the local cache (e.g., storage 234), the account key 222 is used to directly decrypt the encrypted content asset package 224 permitting the calculation of the asset key 204 and then applied to encrypted content asset 206 for immediate decryption and rendering. In this event, the DRM licensing transaction is mitigated.

As an illustrative example, when the account key 222 is not available via the local cache (e.g., storage 234), a licensing endpoint (e.g., rights management system 220) may be accessed by the device 232 to receive the account key 222. Provided the licensing endpoint authenticates the user or device 232 with respect to user account 230, whether directly per the account or indirectly via user or device, the licensing endpoint may also accept and process parameters associated with the encryption event such as an AWK identifier (or other factors related to key selection such as time) or a wrapped AWK to a) identify the account, b) authorize the client per the verified account identity based on business specific rules such as account status according to payments/balances, c) resolve the AWK whether based on a key identifier, other key selection factors such as time, or a wrapped AWK encrypted with an AWK wrapping key accessible to the licensing endpoint, d) provided the device makes its own device-specific wrapping key material available such as an X509 certificate that may be authenticated at the time of licensing or an extension to a previously negotiated session offering session keys, wraps the AWK in a response with caching rights, e) the device downloads the AWK and stores the AWK into the local cache. The AWK (e.g., account key 222) may then be exercised for immediate decryption and rendering per the previous outcome and/or exercised for future content downloads. Additionally or alternatively, the AWK value may diversified via mechanisms such as renewed periodically as a function of time.

Figure 3:
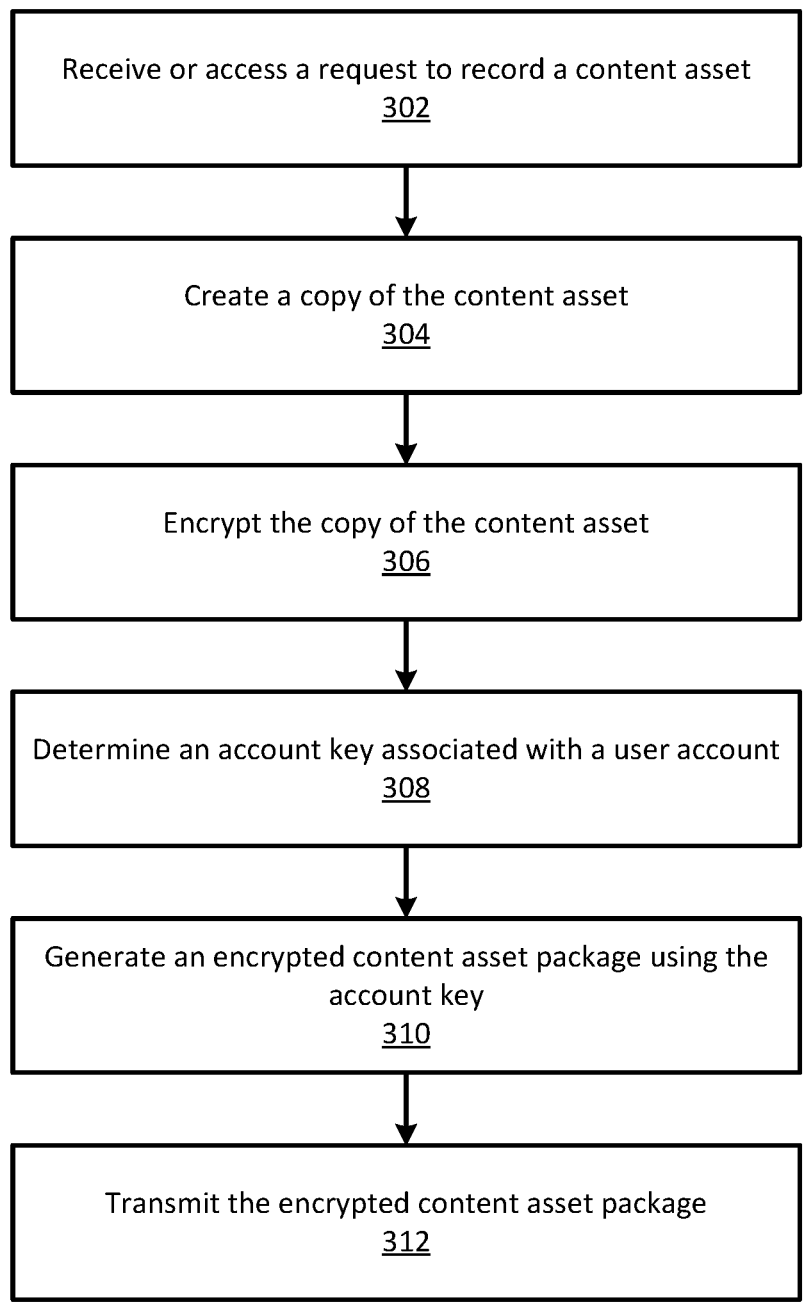
FIG. 3 shows a flow chart of an exemplary method in accordance with aspects of the disclosure.

FIG. 3 shows an example flow chart for a method 300. At step 302, a request to record a content asset may be received or accessed. The request may be received from a user device such as a device configured to facilitate playback of the content asset. The request may comprise an account identifier associated with a user account. The account identifier may be associated with a source of the request to record the content asset.

At step 304, a copy of the content asset may be created. As an example, the content asset may be recorded and/or stored for subsequent playback. The copy of the content asset may be associated with the account identifier.

At step 306, the copy of the content asset may be encrypted to generate an encrypted copy of the content asset. As an example, the copy of the content asset may be encrypted/decrypted using an asset key.

At step 308, an account key associated with the account identifier may be determined.

At step 310, the encrypted copy of the content asset may be further encrypted or wrapped to generate an encrypted content asset package. The encrypted content asset package may comprise the encrypted copy of the content asset and the asset key. The encrypted content asset package may be encrypted/decrypted using the account key determined at step 308. At step 312, the encrypted content asset package may be transmitted, for example, to a user device for decryption and playback.

As an illustrative example, a user may be navigating through the user interface of a program guide. The user may select a content asset from the program guide and may request that the select content asset be recorded. The request for recording may be scheduled and may be managed by a recording scheduler. For example, a scheduling system may track events and may trigger a recording system to execute scheduled recordings. As such, the recording system may copy each content asset and may store the copy or copies. The content asset copies may be encrypted with an asset encryption key. As an example, each content asset copy may be encrypted with a unique asset encryption key. As a further example, a key management system may select the asset key for each content asset copy. Such a selection may be based on a recording identifier of each of the content asset copies. Further, the key management system may select an account key associated with the user account. Such an account key may be selected based on the particular user account and/or other rules such as a temporal rule (e.g., time period limitations, monthly, etc.). The recording system may package and encrypt content assets/copies with the asset key using the account key to form encrypted content asset packages and may include metadata to identify the account key used. The content asset packages may be transmitted immediately or stored for subsequent delivery. This process may be repeated for multiple content assets or recording identifiers with new asset keys, but with the same account key. The same account key may be used for multiple content assets during a time-to-live (TTL) period until the account key expires.

Figure 4:
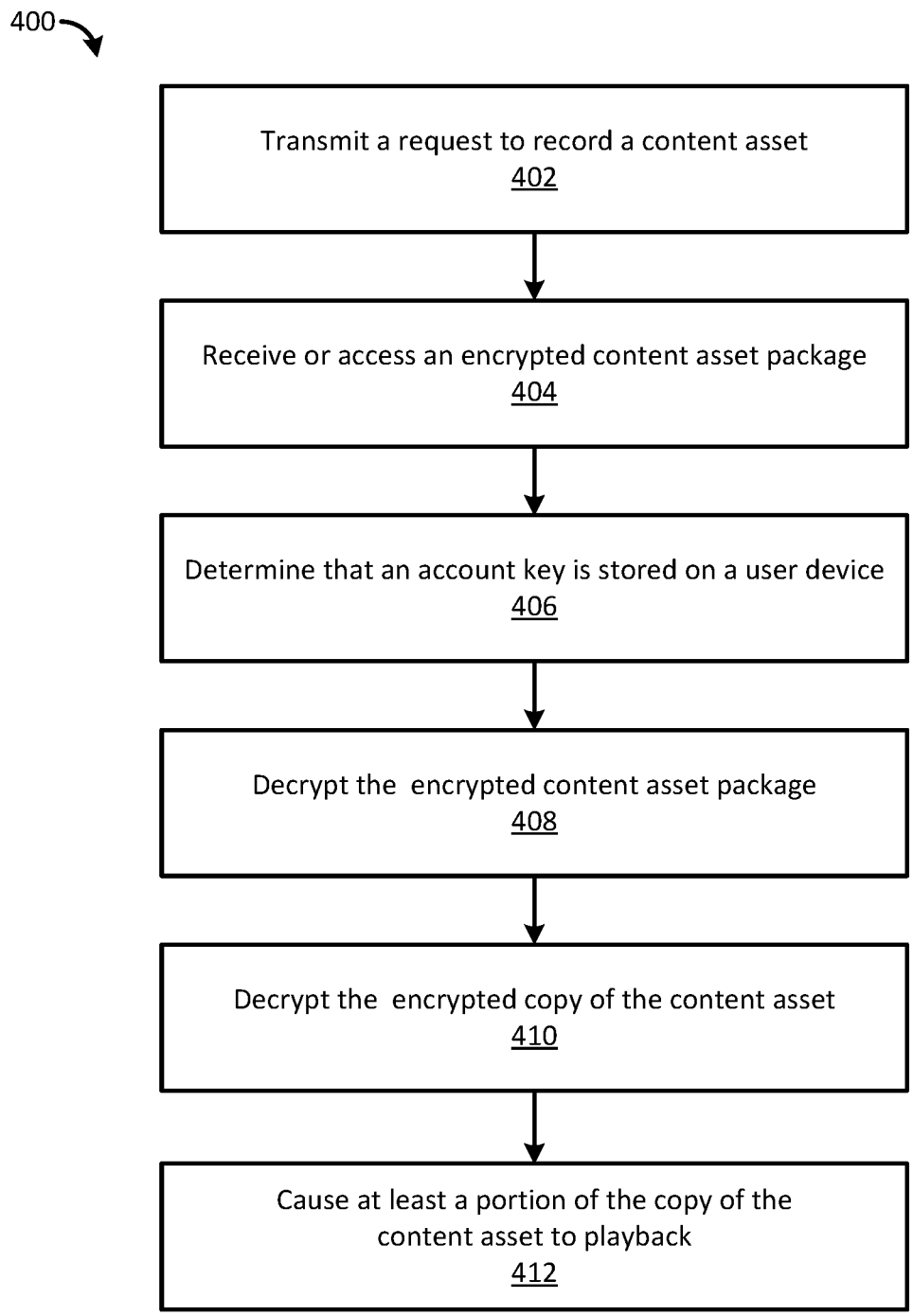
FIG. 4 shows a flow chart of an exemplary method in accordance with aspects of the disclosure.

FIG. 4 shows an example flow chart for a method 400. At step 402, a request for a recorded content asset may be transmitted. The request may be transmitted by a user device such as a content playback device. The request may identifier the recorded content asset, for example using a recording identifier.

At step 404, an encrypted content asset package may be received or accessed, for example, by the source of the request at step 402. The encrypted content asset package may comprise metadata identifying an account key used to encrypt/wrap the contents of the encrypted content asset package. The encrypted content asset package may comprise an encrypted copy of the recorded content asset and an asset key usable to decrypt the encrypted copy of the recorded content asset.

At step 406, it may be determined that the account key is stored on the user device. For example, the account key may be located on a local cache using an account key identifier.

At step 408, the encrypted content asset package may be decrypted to access the encrypted copy of the recorded content asset and the asset key. The encrypted content asset package may be decrypted using the account key stored on the user device.

At step 410, the encrypted copy of the recorded content asset may be decrypted. For example, he encrypted copy of the recorded content asset may be decrypted using the asset key. At step 412, at least a portion of the copy of the recorded content asset may be caused to be displayed.

As an illustrative example, a user may select a recorded content asset (e.g., recording ID) for playback, for example, via a user device. The user device may then receive or access the recorded content asset, for example, using a manifest to locate the recorded content asset. The recorded content asset may be received by the user device as an encrypted bundle or encrypted content asset package. The user device may also receive an indication of an identifier of an account key used to encrypt the bundle. In one example, the user device may not have the account key in cache and may request the account key using the identifier. The user device may request the account key using the identifier. The user device may be authenticated (e.g., pki transmission) based on a device identifier for example. Once authenticated, the user device may receive the active account key. In another example, the user device may have the active account key stored locally. Using the active account key, the encrypted content asset package may be decrypted to access the encrypted copy of the recorded content asset and the asset key. The encrypted copy of the recorded content asset may then be decrypted using the asset key and at least a portion of the copy of the recorded content asset may be caused to be displayed.

Figure 5:
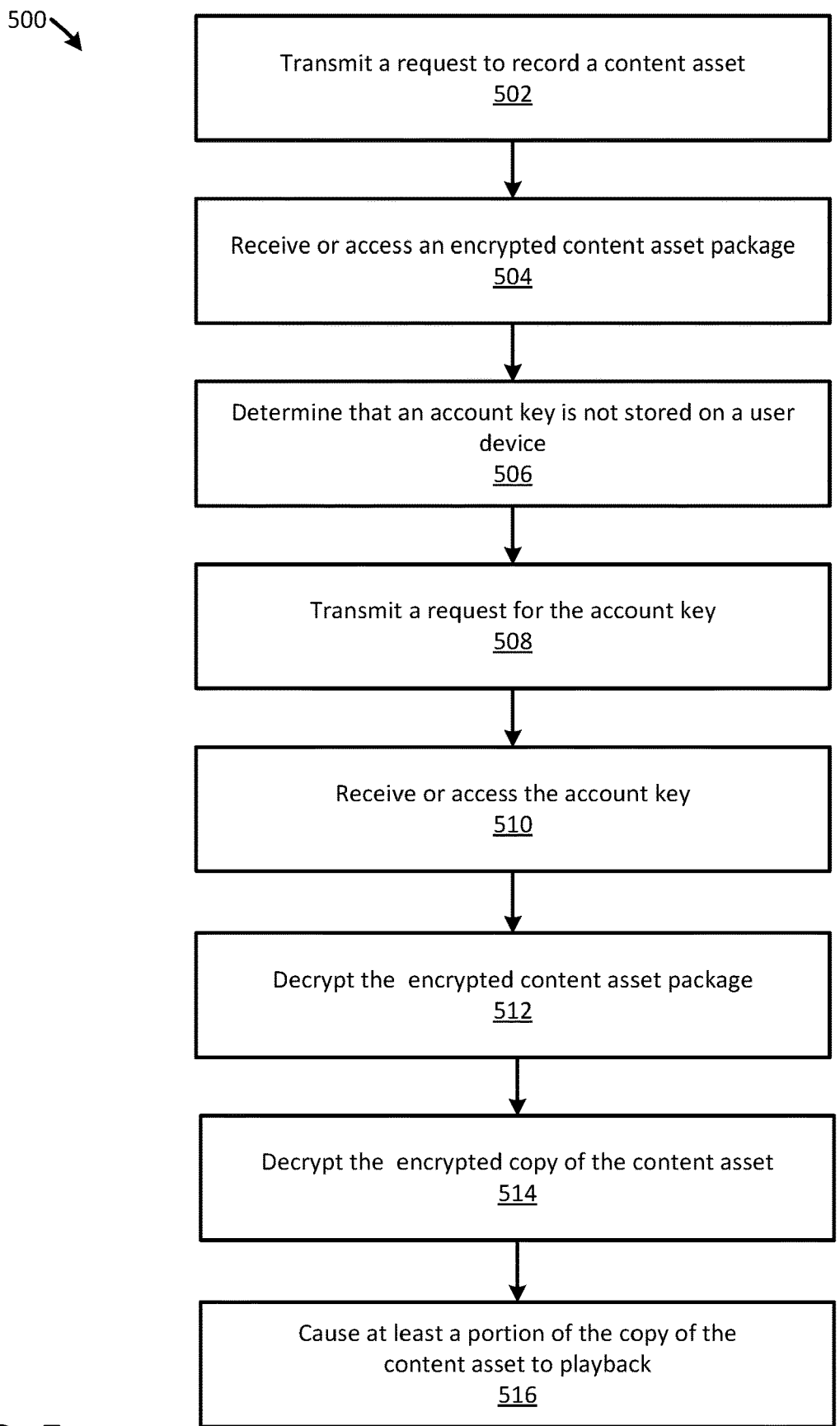
FIG. 5 shows a flow chart of an exemplary method in accordance with aspects of the disclosure.

FIG. 5 shows an example flow chart for a method 500. At step 502, a request for a recorded content asset may be transmitted. The request may be transmitted by a user device such as a content playback device. The request may identifier the recorded content asset, for example using a recording identifier.

At step 504, an encrypted content asset package may be received or accessed, for example, by the source of the request at step 502. The encrypted content asset package may comprise metadata identifying an account key used to encrypt/wrap the contents of the encrypted content asset package. The encrypted content asset package may comprise an encrypted copy of the recorded content asset and an asset key usable to decrypt the encrypted copy of the recorded content asset.

At step 506, it may be determined that the account key is not stored on the user device. For example, the user device may search a local storage (e.g., cache) using an identifier of the account key. If the identified account key is not located, a request for the account key may be transmitted, at step 508.

At step 510, in response to authenticating the source of the request (e.g., user device or a user associated with the user device), the account key may be received. At step 512, the encrypted content asset package may be decrypted to access the encrypted copy of the recorded content asset and the asset key. The encrypted content asset package may be decrypted using the account key stored on the user device.

At step 514, the encrypted copy of the recorded content asset may be decrypted. For example, he encrypted copy of the recorded content asset may be decrypted using the asset key. At step 516, at least a portion of the copy of the recorded content asset may be caused to be displayed.

Figure 6:
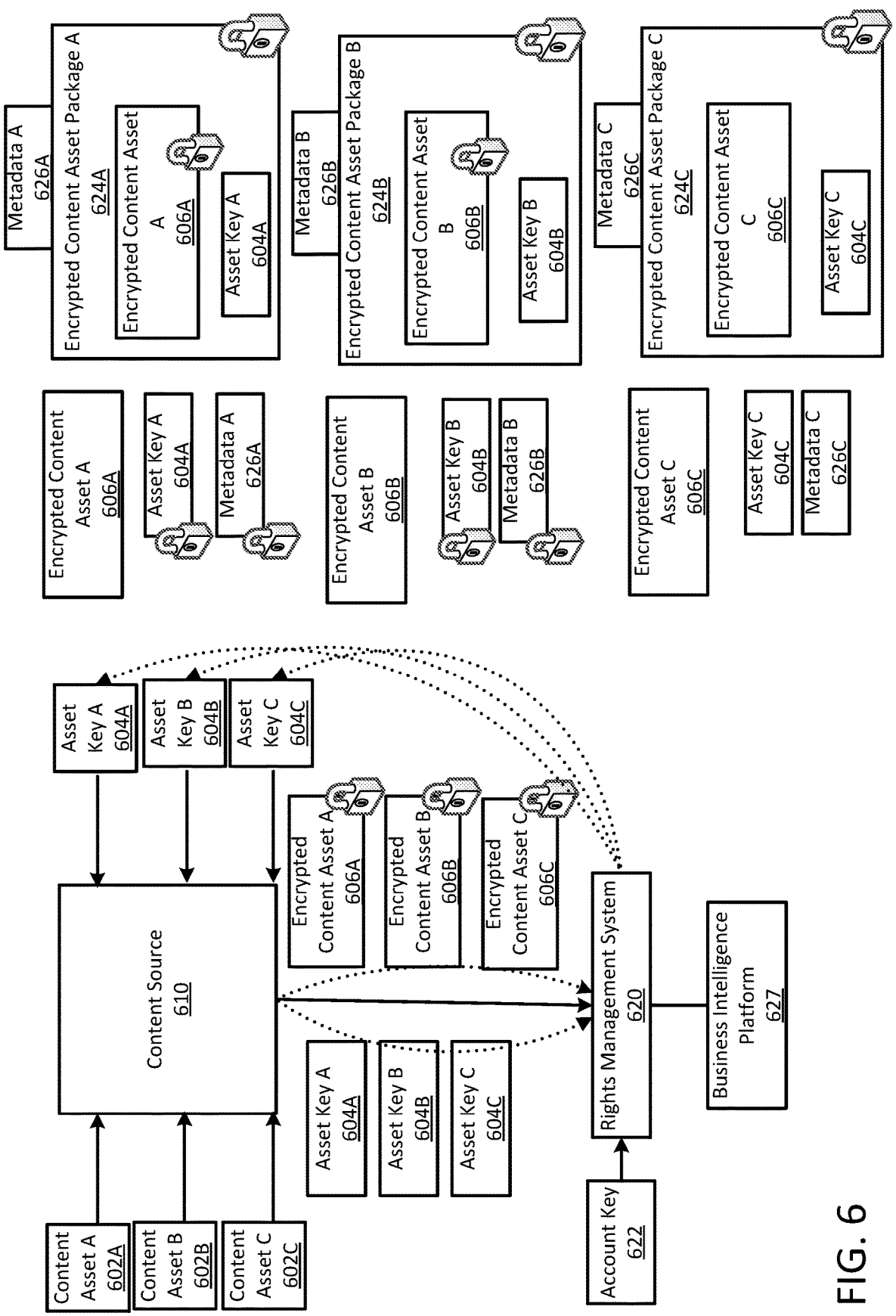
FIG. 6 shows an example system.

FIG. 6 shows an example system for managing recorded content in a system, such as a digital video recorder (DVR) or network digital video recorder (NDVR) system. Fundamentally, the user account (e.g., user account 230 in FIG. 2) targeted by recording content may be known at the time in which recorded content is created. A content source 610 may be or comprise a device, system, and/or network such as, for example, system 100 in FIG. 1 and/or content source 210 in FIG. 2. A plurality of content assets 602A, 602B, 602C, such as recorded content instances, may each be encrypted with a unique content encryption key (CEK) such as asset keys 604A, 604B, 604C. The unique asset keys 604A, 604B, 604C may each only be used to encrypt content assets 602A, 602B, 602C, respectively. For example, content asset 602A may be encrypted with asset key 604A. Content asset 602B may be encrypted with asset key 604B. Content asset 602C may be encrypted with asset key 604C. Encryption of the content assets 602A, 602B, 602C with their respective asset keys 604A, 604B, 604C may each generate encrypted content assets 606A, 606B, 606C.

The encrypted content assets 606A, 606B, 606C may be transmitted to various recipient devices, wherein the asset keys 604A, 604B, 604C may be shared to facilitate decryption of the encrypted content assets 606A, 606B, 606C to expose the underlying decrypted content assets 602A, 602B, 602C. As an example, the encrypted content assets 606A, 606B, 606C may each be augmented to embed the asset keys 604A, 604B, 604C in a wrapped form such as wrapped content encryption keys (WCEK).

A rights management system 620 (e.g., content protection system, key management system/server, rights management system 220 in FIG. 2) may select and/or assign an account-oriented key wrapping key (AWK) such as an account key 622. The account key 622 may be used to further encrypt or wrap each of the encrypted content assets 606A, 606B, 606C resulting encrypted content asset packages 624A, 624B, 624C (e.g., WCEK). The same account key 622 may be used to encrypt or wrap each of the encrypted content assets 606A, 606B, 606C. The account key 622 may be associated with an account, a user, a device, a group of accounts, a group of devices, and/or a group of users. The account may comprise an account of a customer of a digital content service. As an example, a user device, such as device 232 in FIG. 2 may request copies of content assets 602A, 602B, and 602C. Based on the request, the encrypted content assets 606A, 606B, 606C may be encrypted using an account key 622 associated with the user device.

The account key 622 may be determined based on business intelligence data. The rights management system 620 may be comprise and/or be in communication with a business intelligence platform 627. The business intelligence platform 627 may provide business intelligence data. As an example, the rights management system may send an indication of one or more of the content assets 602A, 602B, 602C to the business intelligence platform. The indication of the content asset 602A, 602B, 602C may comprise a content ID. The content ID may comprise a stream ID, such as for linear content. The content ID may comprise a media globally unique identifier (GUID), such as for video on demand (VOD) content. The content ID may comprise a recording ID for cloud digital video recorder (CDVR.) The indication of the content asset 602A, 602B, 602C may comprise a content class. Examples of content classes include Title VI Linear, Title VI VOD, Title VI CDVR, TVE Linear, and TVE VOD, as examples.

Based on the indication of the content asset 602A, 602B, 602C, the business intelligence platform 627 may determine business intelligence data associated with the content asset 602A, 602B, 602C. The business intelligence data may comprise a group associated with the content asset 602A, 602B, 602C. The group may comprise a demographic group, such as an age group, a geographic group, a career group, an education level group, an income range group, and/or an ethnicity group. The group may comprise a demographic group with high viewership ratings for a type of content asset of the indicated content asset 602A, 602B, 602C.

The business intelligence data may comprise a content quality class, such as regular content or premium content. The business intelligence data may comprise a content access limit, such as a rental expiration time.

The business intelligence platform 627 may send an indication of the business intelligence data to the rights management system 620. Based on the indication of the business intelligence data, the rights management system 620 may determine an account key 622. For example, the rights management system 620 may determine an account key 622 associated with the group. As an example, the rights management system 620 may determine an account key 622 associated with the content quality class.

The account key 622 may be determined based on a type of device. Examples of device types include set top boxes, mobile phones, tablet devices, and/or laptop computers, as examples. The rights management system 620 may determine an account key 622 associated with the group. Based on the demographic group and/or the content assets, the rights management system 620 may determine the account key 622.

The account key 622 may be determined based on a type of device. Examples of device types include set top boxes, mobile phones, tablet devices, and/or laptop computers, as examples. The rights management system 620 may determine an account key 622 associated with the type of device.

The encrypted content asset packages 624A, 624B, 624C may be embedded in the content meta-data 626A, 626B, 626C of each of the encrypted content asset packages 624A, 624B, 624C. The encrypted content asset packages 624A, 624B, 624C may comprise the encrypted content assets 606A, 606B, 606C and/or the asset keys 604A, 604B, 604C. Other information may be encrypted/wrapped into the encrypted content asset packages 624A, 624B, 624C.

The account key 622 may be sent to the devices as described in reference to FIG. 2. For example, the account key 622 (e.g., AWK) may be identified within the content meta-data 626A, 626B, 626C via an approach such as the embedding of an AWK identifier. As content is acquired by devices (e.g., clients, device 232 in FIG. 2), the AWK identifier is resolved. The devices may check storage 234 such as a local cache for the AWK (e.g., account key 222) as specified by the AWK identifier. The account key 622 may be available via the local cache (e.g., storage 234 in FIG. 2). The account key 622 may be used to directly decrypt the encrypted content asset packages 624A, 624B, 624C permitting the calculation of the asset keys 604A, 604B, 604C and then applied to encrypted content assets 606A, 606B, 606C for immediate decryption and rendering. In this event, the DRM licensing transaction may be mitigated. When the account key 622 is not available via the local cache (e.g., storage 234 in FIG. 2), a licensing endpoint (e.g., rights management system 620) may be accessed by the device to receive the account key 622, as described in reference to FIG. 2.

Figure 7:
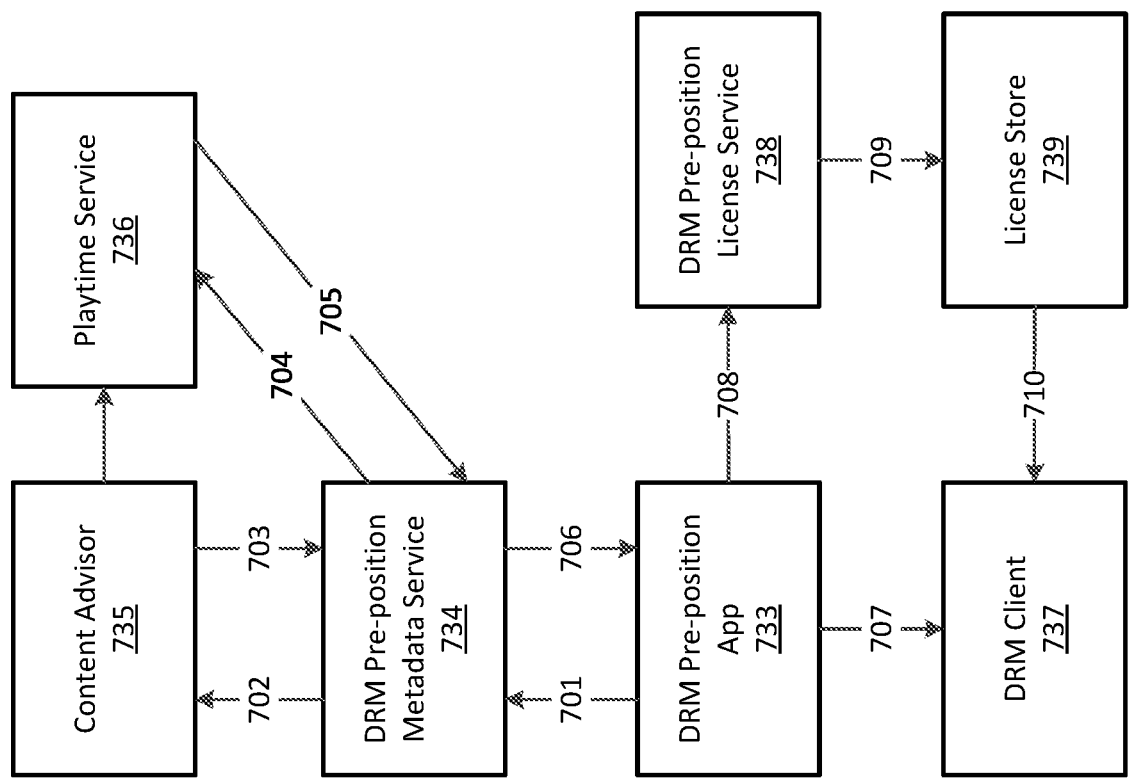
FIG. 7 shows an example method.

As shown in FIG. 7, decryption resources may be pre-positioned on one or more devices (e.g., clients, device 232 in FIG. 2). The decryption resources may comprise the account key 622. As an example, an account key associated with a group may be pre-positioned on devices of users in the group. An account key associated with a type of device may be pre-positioned on devices of that type. An account key associated with a household may be pre-positioned on device in the household. An account key associated with a subscription to a digital content service may be pre-positioned on devices associated with the customer having the subscription.

At step 701, a DRM pre-position application 733 may send a pre-position request. The application may comprise a module of the device (e.g., client, device 232 in FIG. 2) or on the rights management system 620. The pre-position request may be sent to a DRM pre-position metadata service 734. The DRM pre-position metadata service 734 may comprise a computing device. The pre-position request may comprise an indication to pre-position the decryption resources. The pre-position request may comprise an indication of session information. The session information may comprise a session token. The session information may comprise an indication of an account identifier. The session may comprise an indication of a device type. The session information may comprise an indication of a device identifier. The pre-position request may comprise an indication of a session authenticated HTTP header.

The DRM pre-position metadata service 734 may process the pre-position request. Processing the pre-position request may comprise authenticating the session authenticated HTTP header. Processing the pre-position request may comprise authenticating the session token. Processing the pre-position request may comprise extracting attributes from the session token, such as the account identifier, a billing account identifier, the device type, and/or the device identifier.

At step 702, the DRM pre-position metadata service 734 may send a content advice request. The content advice request may be sent to a content advisor 735. The content advisor 735 may comprise a computing device. The content advisor 735 may be configured to control what content (e.g., types of content) that may be viewed. The content advisor 735 may comprise hardware or software and may execute logic that determines whether certain rules or criteria are met to enable certain content to be accessed or viewed. The content advice request may comprise parameters determined based on the session token and/or the session authenticated HTTP header. The content advice request may comprise the attributes extracted from the session token, such as the account identifier, the billing account identifier, the device type, and/or the device identifier.

At step 703, based on the content advice request, the content advisor 735 may send a content advice response. The content advice response may be sent to the DRM pre-position metadata service 734. The content advice response may comprise a list of content items. Each of the content items may comprise an indication of a content class. Each of the content items may comprise an indication of a content ID type. Each of the content items may comprise an indication of a content ID. The content ID may comprise a stream ID, such as for linear content. The content ID may comprise a media GUID, such as for VOD content. The content ID may comprise a recording ID for CDVR.

The content advice response may comprise an indication of candidate content groups, such as subscription-based content, as an example. The content advice response may comprise an indication of transactional content associated with the device. The content advice response may comprise an indication of account-bound content, such as CDVR, as an example. The content advice response may comprise an indication of popular content, such as new content, highly-rated content. For example the popular content may comprise the top five linear stations. The content advice response may comprise an indication of content assets based on account or device-specific tune history. For example, the response may indicate the last nine linear streams or activity with respect to a digital content series.

At step 704, the DRM pre-position metadata service 734 may send an entitlement request. The request may be send to a playtime service 736, such as the Compass Playtime Service, as an example. The entitlement request may comprise parameters determined based on the session token and/or the session authenticated HTTP header. The entitlement request may comprise an indication of one or more of the content ID's in the list in the content advice response. The entitlement request may comprise an indication of the account identifier.

At step 705, based on the entitlement request, the playtime service 736 may determine whether each content ID is entitled based on the indicated account. The playtime service 736 may send an entitlement response. The entitlement response may be sent to the DRM pre-position metadata service 734. The entitlement response may comprise an indication, for each content ID, of entitlement or an indication of non-entitlement of the content ID. The entitlement response may comprise a binary response, such as true or false.

At step 706, based on the entitlement response, the DRM pre-position metadata service 734 may send a DRM pre-position metadata response. The DRM pre-position metadata response may be sent to the DRM pre-position application 733. The DRM pre-position metadata response may comprise one or more DRM metadata items. Each of the DRM metadata items may be pre-entitled. For example, the DRM metadata items may be associated with one or more of the content items that were indicated entitled in the content advice response.

Each of the DRM metadata items may be associated with a particular DRM system. A device may send DRM license requests for specific DRM metadata elements. Each of the DRM metadata items may be pre-entitled and/or pre-authorized for a license grant. The license grant may be constrained to a limited validity period. The license grant may be bound to an account and/or a device. As a result, each DRM metadata item may be authenticated and may comprise one or more assertions. The assertions may comprise DRM metadata in the event a DRM vendor-specific platform is targeted. The DRM metadata may be omitted for generic key containers. The assertions may comprise content metadata. The content metadata may comprise an assertion of the content or content group targeted. The assertions may comprise an indication of a time limit, such as a time to live (TTL) of a validity period for the DRM pre-position metadata. The assertions may comprise the account identifier, such as an account ID and/or a billing account number. The assertions may comprise a device type. The assertions may comprise a device ID that may bind the pre-fetch metadata to a specific device and/or account.

At step 707, the DRM pre-position application 733 may send a DRM license request to a DRM client 737. The DRM pre-position application 733 may send the DRM pre-position metadata elements to the DRM client 737. Each DRM pre-position metadata element may be associated with DRM vendor-specific licensing and/or DRM vendor-specific key licensing. For each DRM pre-position metadata element, the DRM pre-position application 733 may interface with a DRM client associated with a type of DRM pre-position metadata to generate a device-individualized DRM license request. DRM vendor-specific metadata elements may be used to interface a DRM client 737, such as a Widevine DRM client or a PlayReady DRM client, as examples. DRM agnostic elements may be used to interface with SecAPI.

At step 708, the DRM pre-position application 733 may send a DRM pre-position license request. The DRM pre-position license request may be sent to a DRM pre-position license service 738. The DRM pre-position license service 738 may comprise a computing device. The DRM pre-position license request may comprise the session token. The DRM pre-position license request may comprise the session authenticated HTTP header. The DRM pre-position license request may comprise DRM license requests. The DRM license requests may be received from the DRM client.

At step 709, based on the DRM pre-position license request, the DRM pre-position license service 738 may send one or more DRM licenses. The DRM license may be sent to a license store 739. The license store 739 may comprise a database. The license store 739 may comprise a license server. The DRM license may be sent to a license store 739 associated with a DRM associated with the DRM license. The DRM license may comprise a license associated with a content asset. The DRM license may comprise a license associated with an account key. The DRM license may comprise a license associated with an asset key. The DRM license may comprise an account key container. The DRM license may comprise an asset key container.

At step 710, the DRM client 737 may download one or more DRM license from the license store 739. For each DRM license downloaded, the DRM pre-position application 733 may interface with the DRM client 737 associated with a DRM associated with the DRM license in order to populate the appropriate license store 739. A DRM vendor-specific license may be used to interface a DRM client 737, such as a Widevine client or a PlayReady client, as examples. A DRM agnostic element license may be used to interface with SecAPI.

The pre-positioning of the decryption resources may comprise a workflow that is partitioned from the generation of the encrypted content asset packages 624A, 624B, 624C and/or the determination of the asset key 622. For example, the based on a specific instance of a security client on the device. The pre-positioning of the decryption resources may be agnostic to the digital rights management system 620 and/or digital content service provider. The pre-positioning of the decryption resources may facilitate intelligent advising of clients with respect to optimal candidates for pre-positioned decryption resources.

Figure 8:
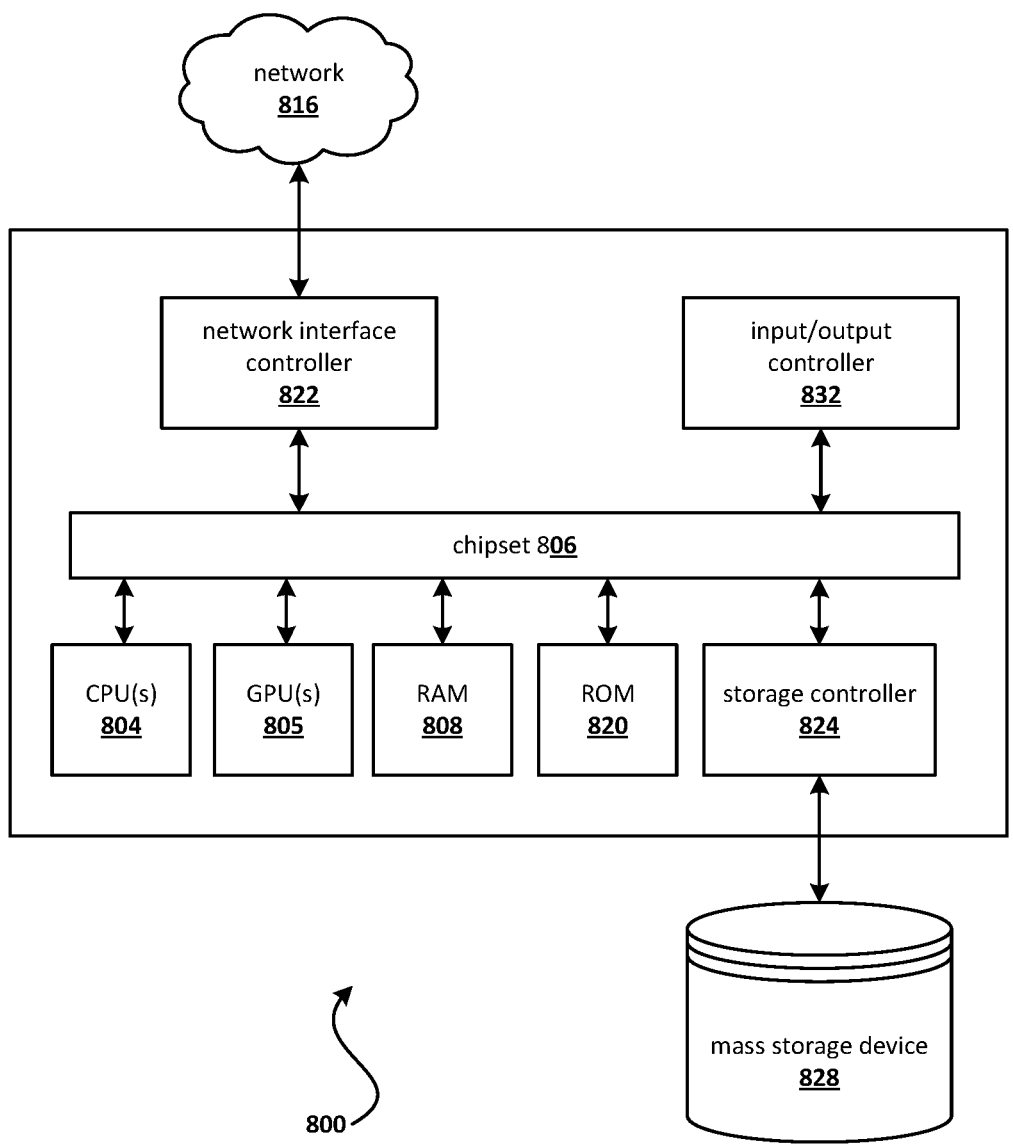
FIG. 8 shows a block diagram of an exemplary computing device.

FIG. 8 depicts a computing device that may be used in various aspects, such as the servers, modules, and/or devices depicted in FIG. 1. With regard to the example architecture of FIG. 1, the transcoder 114, the linear module 116, the linear packager 118, the linear storage 120, the recording management system 124, the recording agents 126*a-c*, the recording storage 128, the archive storage 130, the origin server 134, and/or the device 132 may each be implemented in an instance of a computing device 800 of FIG. 8. The computer architecture shown in FIG. 8 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 3, 4, and 5.

The computing device 800 may include a baseboard, or "motherboard," which is a printed circuit board to which a multitude of components or devices may be connected by way of a system bus or other electrical communication paths. One or more central processing units (CPUs) 804 may operate in conjunction with a chipset 806. The CPU(s) 804 may be standard programmable processors that perform arithmetic and logical operations necessary for the operation of the computing device 800.

The CPU(s) 804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 804 may be augmented with or replaced by other processing units, such as GPU(s) 805. The GPU(s) 805 may comprise processing units specialized for but not necessarily limited to highly parallel computations, such as graphics and other visualization-related processing.

A chipset 806 may provide an interface between the CPU(s) 804 and the remainder of the components and devices on the baseboard. The chipset 806 may provide an interface to a random access memory (RAM) 808 used as the main memory in the computing device 800. The chipset 806 may further provide an interface to a computer-readable storage medium, such as a read-only memory (ROM) 820 or non-volatile RAM (NVRAM) (not shown), for storing basic routines that may help to start up the computing device 800 and to transfer information between the various components and devices. ROM 820 or NVRAM may also store other software components necessary for the operation of the computing device 800 in accordance with the aspects described herein.

The computing device 800 may operate in a networked environment using logical connections to remote computing nodes and computer systems through local area network (LAN) 816. The chipset 806 may include functionality for providing network connectivity through a network interface controller (NIC) 822, such as a gigabit Ethernet adapter. A NIC 822 may be capable of connecting the computing device 800 to other computing nodes over a network 816. It should be appreciated that multiple NICs 822 may be present in the computing device 800, connecting the computing device to other types of networks and remote computer systems.

The computing device 800 may be connected to a mass storage device 828 that provides non-volatile storage for the computer. The mass storage device 828 may store system programs, application programs, other program modules, and data, which have been described in greater detail herein. The mass storage device 828 may be connected to the computing device 800 through a storage controller 824 connected to the chipset 806. The mass storage device 828 may consist of one or more physical storage units. A storage controller 824 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 800 may store data on a mass storage device 828 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 828 is characterized as primary or secondary storage and the like.

For example, the computing device 800 may store information to the mass storage device 828 by issuing instructions through a storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 may further read information from the mass storage device 828 by detecting the physical states or characteristics of one or more particular locations within the physical storage units.

In addition to the mass storage device 828 described above, the computing device 800 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 800.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 828 depicted in FIG. 8, may store an operating system utilized to control the operation of the computing device 800. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 828 may store other system or application programs and data utilized by the computing device 800.

The mass storage device 828 or other computer-readable storage media may also be encoded with computer-executable instructions, which, when loaded into the computing device 800, transforms the computing device from a general-purpose computing system into a special-purpose computer capable of implementing the aspects described herein. These computer-executable instructions transform the computing device 800 by specifying how the CPU(s) 804 transition between states, as described above. The computing device 800 may have access to computer-readable storage media storing computer-executable instructions, which, when executed by the computing device 800, may perform the methods described in relation to FIGS. 3-7.

A computing device, such as the computing device 800 depicted in FIG. 8, may also include an input/output controller 832 for receiving and processing input from a number of input devices, such as a keyboard, a mouse, a touchpad, a touch screen, an electronic stylus, or other type of input device. Similarly, an input/output controller 832 may provide output to a display, such as a computer monitor, a flat-panel display, a digital projector, a printer, a plotter, or other type of output device. It will be appreciated that the computing device 800 may not include all of the components shown in FIG. 8, may include other components that are not explicitly shown in FIG. 8, or may utilize an architecture completely different than that shown in FIG. 8.

As described herein, a computing device may be a physical computing device, such as the computing device 800 of FIG. 8. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
   receiving a request to record a content asset, wherein the request comprises a user account identifier;
   creating a copy of the content asset, wherein the copy of the content asset is associated with the user account identifier;
   encrypting the copy of the content asset to generate an encrypted copy of the content asset, wherein the encrypted copy of the content asset is decryptable with an asset key;
   determining an account key associated with the user account identifier;
   generating, using the account key, an encrypted content asset package comprising at least the asset key, wherein the encrypted content asset package is decryptable with the account key; and
   transmitting the encrypted content asset package and an identifier associated with the account key.

2. The method of claim 1, wherein the user account identifier is associated with a premises receiving service from a service provider associated with the copy of the content asset.

3. The method of claim 1, wherein the request to record the content asset is received via a user interface of a playback device.

4. The method of claim 1, wherein the request to record the content asset is received by a network digital video recording system.

5. The method of claim 1, wherein the account key comprises a time-to-live (TTL).

6. The method of claim 1, wherein the encrypted content asset package is transmitted to a playback device.

7. The method of claim 1, wherein the encrypted content asset package comprises the encrypted copy of the content asset.

8. The method of claim 1, wherein the encrypted content asset package and the identifier associated with the account key are each transmitted in separate communication messages.

9. A method comprising:
   transmitting, from a content playback device, a request for a recorded content asset, wherein the request is associated with a user account identifier;
   receiving, by the content playback device, an encrypted content asset package and an identifier of an account key, wherein the encrypted content asset package is encrypted using the account key, and wherein the encrypted content asset package comprises an encrypted copy of the recorded content asset and at least an asset key usable to decrypt the encrypted copy of the recorded content asset;

determining that the account key is stored on the content playback device;

using the account key stored on the content playback device, decrypting the encrypted content asset package to access the asset key; and using the asset key, decrypting the encrypted copy of the recorded content asset.

10. The method of claim 9, wherein the user account identifier is associated with a user associated with the content playback device and a service provider.

11. The method of claim 9, wherein the encrypted content asset package comprises the encrypted copy of the recorded content asset.

12. The method of claim 9, wherein the identifier of the account key is not encrypted with the account key.

13. The method of claim 9, wherein the determining the account key is stored on the content playback device comprises searching local storage of the content playback device using the identifier of the account key.

14. The method of claim 9, further comprising causing display of the decrypted copy of the recorded content asset.

15. A method comprising:

transmitting, from a content playback device, a request for a recorded content asset, the request associated with a user account identifier;

receiving, by the content playback device, an encrypted content asset package and an identifier of an account key, wherein the encrypted content asset package is encrypted using the account key, and wherein the encrypted content asset package comprises an encrypted copy of the recorded content asset and at least an asset key usable to decrypt the encrypted copy of the recorded content asset;

determining that the account key is not stored on the content playback device;

transmitting a request for the account key, wherein the request comprises an identifier of the content playback device;

in response to authenticating the content playback device or a user associated with the content playback device, receiving, by the content playback device, the account key;

using the account key, decrypting the encrypted content asset package to access the asset key; and using the asset key, decrypting the encrypted copy of the recorded content asset.

16. The method of claim 15, wherein the user account identifier is associated with the user associated with the content playback device and a service provider.

17. The method of claim 15, wherein the encrypted content asset package comprises the encrypted copy of the recorded content asset.

18. The method of claim 15, wherein the identifier of the account key is not encrypted with the account key.

19. The method of claim 15, wherein the determining the account key is not stored on the content playback device comprises searching local storage of the content playback device using the identifier of the account key.

20. The method of claim 15, further comprising causing display of the decrypted copy of the recorded content asset.

* * * * *